United States Patent
Shon et al.

[19]

[11] Patent Number: 6,072,256
[45] Date of Patent: Jun. 6, 2000

[54] BRUSHLESS DC MOTOR WITH A TWO-LAYERED PERMANENT MAGNET ROTOR STRUCTURE

[75] Inventors: Jong-chull Shon; Dong-yun Hwang, both of Suwon, Rep. of Korea

[73] Assignee: SamSung Electronics Co., Ltd., Kyungki-do, Rep. of Korea

[21] Appl. No.: 09/285,694

[22] Filed: Apr. 5, 1999

[30] Foreign Application Priority Data

Jul. 22, 1998 [KR] Rep. of Korea ...................... 98-29504

[51] Int. Cl.⁷ ................................................. H02K 21/12
[52] U.S. Cl. .............................................. 310/156; 29/598
[58] Field of Search .................................. 310/156, 218, 310/261; 29/598

[56] References Cited

U.S. PATENT DOCUMENTS

| | | | |
|---|---|---|---|
| 4,139,790 | 2/1979 | Steen | 310/156 |
| 4,211,963 | 7/1980 | Muller | 318/254 |
| 4,327,302 | 4/1982 | Hershberger | 310/156 |
| 4,510,680 | 4/1985 | Miller et al. | 29/598 |
| 4,551,645 | 11/1985 | Takahashi et al. | 310/46 |
| 5,191,256 | 3/1993 | Reiter, Jr. et al. | 310/156 |
| 5,296,773 | 3/1994 | El-Antably et al. | 310/261 |
| 5,369,325 | 11/1994 | Nagate et al. | 310/156 |
| 5,510,662 | 4/1996 | Tanimoto et al. | 310/156 |
| 5,679,995 | 10/1997 | Nagate et al. | 310/156 |

FOREIGN PATENT DOCUMENTS 6-66277  2/1993  Japan .................. H02K 21/14

*Primary Examiner*—Nestor Ramirez
*Assistant Examiner*—Joseph Waks
*Attorney, Agent, or Firm*—Robert E. Bushnell, Esq.

[57] ABSTRACT

A brushless DC motor having external and internal permanent magnets buried in rotor core in a two-tier structure to form the poles of the rotor, thereby improving efficiency of the motor and reducing vibration and noise, as well.

16 Claims, 2 Drawing Sheets

BRUSHLESS DC MOTOR WITH A TWO-LAYERED PERMANENT MAGNET ROTOR STRUCTURE

BACKGROUND OF THE INVENTION

1. Field of the Invention

The present invention relates to a brushless direct current DC motor and more particularly to a brushless DC motor adapted for improvement in structure of a rotor to improve an efficiency and attenuate vibration and noise of the motor.

2. Description of the Prior Art

Generally, motors are designed to generate a high torque for obtainment of high efficiency and in order to generate a high torque, brushless DC motors are developed utilizing permanent magnets. In other words, a brushless DC motor utilizing a permanent magnet yields a higher efficiency than a motor without a permanent magnet due to a magnetic field formed by the permanent magnet.

FIG. 1 is a schematic diagram for illustrating a rotor of a brushless DC motor according to a first embodiment of the prior art, where the rotor 10 is disposed with a rotor core 12 on which a permanent magnet 14 is attached.

However, there is a problem in the first embodiment of the prior art in that the rotor 10 is rotated only by torque of the permanent magnet 14 according to repulse or suction of the permanent magnet 14, thereby being unable to maximize the efficiency.

FIG. 2 is a schematic diagram for illustrating a structure of a rotor in a brushless DC motor according to a second embodiment of the prior art, where the brushless DC motor includes a rotor 20 disposed in a stator 30 formed with a slot 32 therein between slits 26, where the rotor 20 is mounted with a permanent magnet 24 inside of the rotor core 22.

In other words, there is a problem in the brushless DC motor according to the second embodiment of the prior art thus constructed in that it rotates the rotor 20 by way of torque from the permanent magnet 24 and reluctance torque generated by coils of the stator 30 pulling the rotor core 22, such that it has a higher efficiency than the brushless DC motor according to the first embodiment of the prior art but creates more vibration and noise in inverse proportion to the improved efficiency.

The vibration and noise are generated by variation of electromagnetic torque, a kind of load and torque change of the load according to its characteristic, where the torque change is generated by saturation of the core, eccentricity and unsymmetrical structure of the rotor and the stator, uneven distribution of slit permeance caused by shapes of the stator slot and rotor magnetic poles, uneven states of the permanent magnet and windings and the like.

Particularly, changes of the axle which affects the greatest influence to a speed control characteristic of a brushless DC motor is largely generated by pulsation of slit flux density caused by an opening width of stator slit, shapes of the rotor magnetic poles and a mounted state of the permanent magnet. In other words, the brushless DC motor generates a mutual electronic suction force between the rotor core and the permanent magnet according to basic wave flux in a slit and harmonic flux, and the suction force is changed to generate vibration.

The harmonic flux components occurring in the slit further generate complicated electromagnetic harmonic components according to shapes of the rotor core and the stator core, and suction force or repulsive force is generated between stacked core sheet metals by the harmonic components thus described, thereby generating the vibration and noise.

Particularly, because a currently-used brushless DC motor for high speed and high output is a slot type brushless DC motor, cogging torque is generated by the slot and the vibration is further generated by the cogging torque.

At this time, the cogging torque acting as a noise source in the burshless DC motor thus described is generated by a difference of force of a magnetic substance and is applied because magnetic energy stored in the permanent magnet and slit between the stator teeth differs according to position thereof.

Furthermore, the period of the cogging torque is decided by the number of magnetic poles in a rotor and the combination of the stator teeth, where, a short period of the cogging torque corresponds to a reduction of intensity of cogging energy by way of dispersion of slit energy.

Accordingly, in order to reduce the cogging torque, a distance between the stator teeth should be adjusted but, however, there is a limit in adjusting the distance between the stator teeth. In other words, the stator teeth should maintain a mutually predetermined distance in order to insert windings, where the distance should be maintained by the winding method, such that there is a limitation in adjusting the distance between the stator teeth.

Consequently, flux density existing between a stator and a rotor should be enlarged and concurrently evened out in order to improve efficiency of a brushless DC motor and to reduce vibration and noise thereof, such that the shape of permanent magnet inserted into the rotor core is important.

In other words, magnetic permeability of a core is around 3,000~4,000(H/m), which is higher than that of air or a permanent magnet, and electromagnetic force induced from the stator generates a force for pulling a core of a rotor, such that it is very important to design a shape of a permanent magnet because the permanent magnet has a magnetic permeability almost identical to that of air to perform a capability of a slit.

SUMMARY OF THE INVENTION

However, there is a problem in the brushless DC motor according to the prior art in that vibration and noise are increased in proportion to improved efficiency because improvement of efficiency is focused on instead of even flux distribution of slit.

Accordingly, the present invention is disclosed to solve the aforementioned problems and it is an object of the present invention to provide a brushless DC motor adapted to improve a structure of a rotor for an increase of efficiency of the motor and for reduction of vibration and noise, as well.

In accordance with the object of the present invention, there is provided a brushless DC motor including a rotor having a permanent magnet buried in a rotor core, wherein each pole of the rotor is formed by a two-tiered structure of an external permanent magnet and an internal permanent magnet buried in a rotor core.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE INVENTION

Preferred embodiments of the present invention will now be described in detail with reference to the accompanying drawings.

Figure 1:
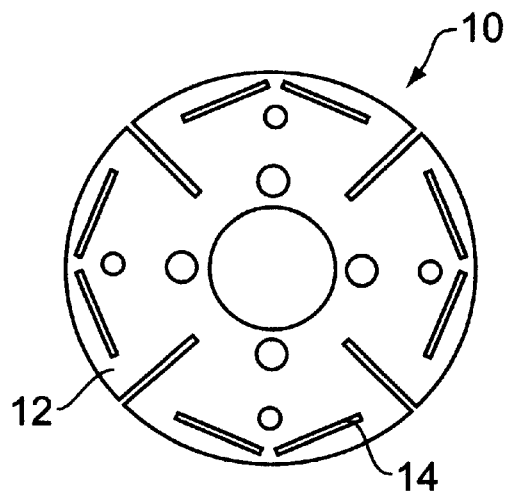
FIG. 1 is a schematic drawing for illustrating a rotor structure of a brushless DC motor according to a first embodiment of the prior art.
Figure 2:
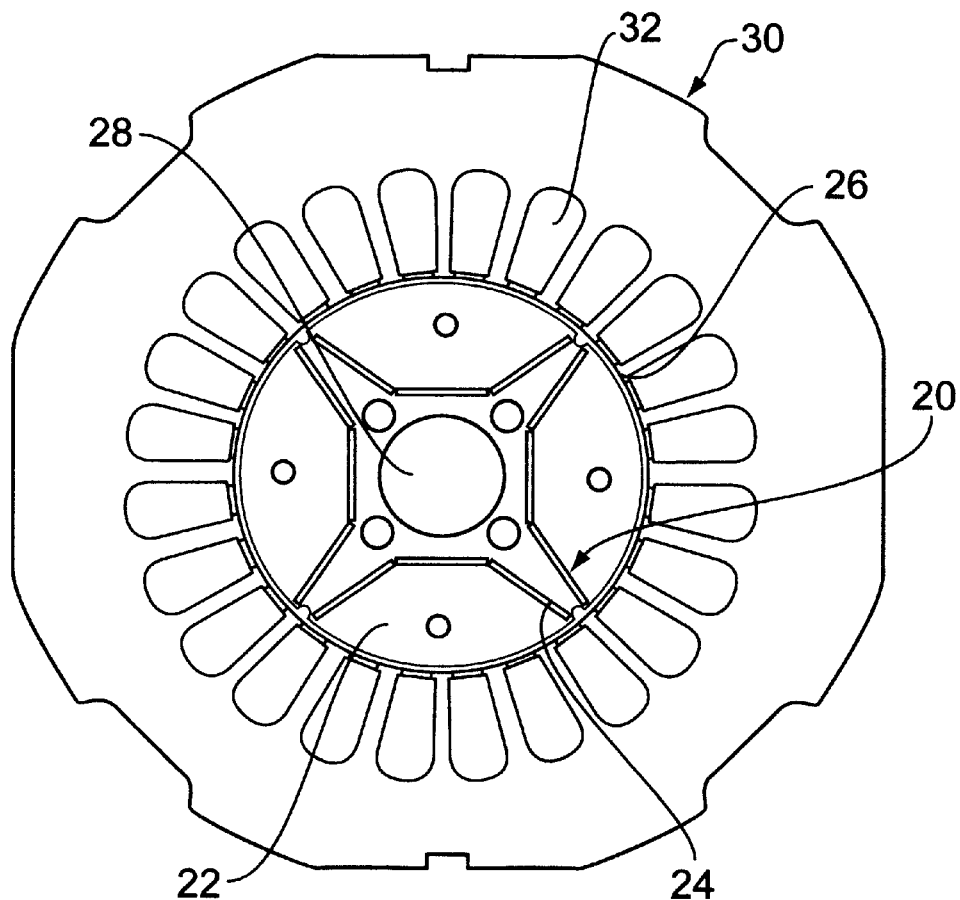
FIG. 2 is a schematic drawing for illustrating a rotor structure of a brushless DC motor according to a second embodiment of the prior art.
Figure 3:
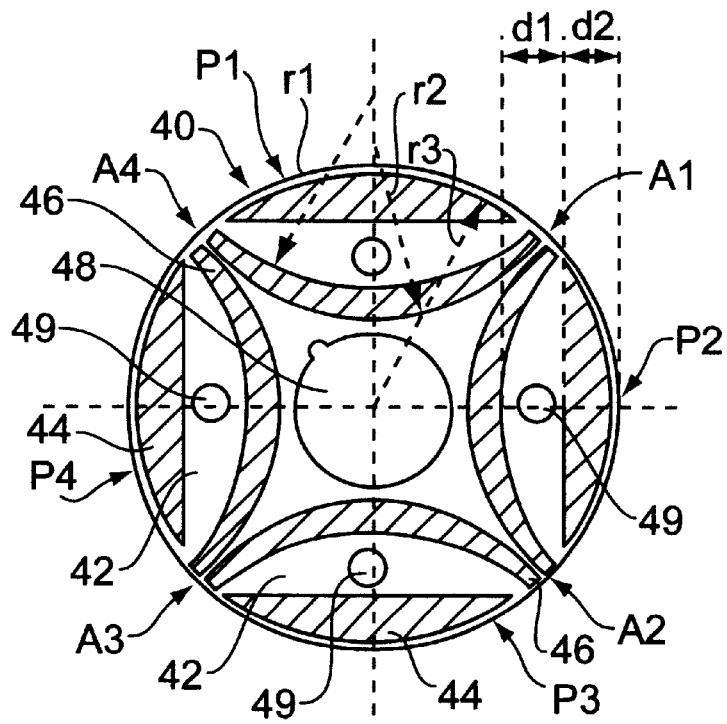
FIG. 3 is a schematic drawing for illustrating a rotor structure of a brushless DC motor according to a first embodiment of the present invention.

FIG. 3 is a schematic drawing for illustrating a rotor structure of a brushless DC motor according to a first embodiment of the present invention, where the rotor 40 is disposed with a rotor core 42 buried by a two-tiered or two-layered structure of an external permanent magnet 44 and an internal permanent magnet 46.

Rotor 40 has a plurality of poles P1, P2, P3 and P4, each including an internal permanent magnet 44 and an external permanent magnet 46, and rotor 40 has areas A1, A2, A3 and A4 where each pole of the rotor 40 joins to an adjacent pole of the rotor 40.

The external permanent magnet 44 is formed at a peripheral side thereof with the same circular arc as that of the rotor 40 at its periphery and the internal permanent magnet 46 has an inner circular arc and an outer circular arc to protrude toward a central axle 48 of the rotor 40.

Furthermore, when an inner radius of the internal permanent magnet 46 is given as r1, an outer radius of the internal permanent magnet 46 is given as r2 and an outer radius of the external permanent magnet 44 is defined as r3, the external permanent magnet 44 and the internal permanent magnet 46 are formed in such fashion as the ratio of r2<r3<r1.

Thickness (d2) of the external permanent magnet 44 is formed to be of the same length as or smaller than the distance (d1) between the external permanent magnet 44 and the internal permanent magnet 46, where the magnets 44 and 46 are formed with ferrite or rare earth elements.

Furthermore, in order to prevent the external and internal permanent magnets 44 and 46 from flying outwardly by the centrifugal force when the rotor 40 is rotated at high speed, the magnets 44 and 46 are secured to the rotor core 42 by way of a fastening rivet 49 or a plurality of rivets 49 as illustrated in FIG. 3.

Figure 4:
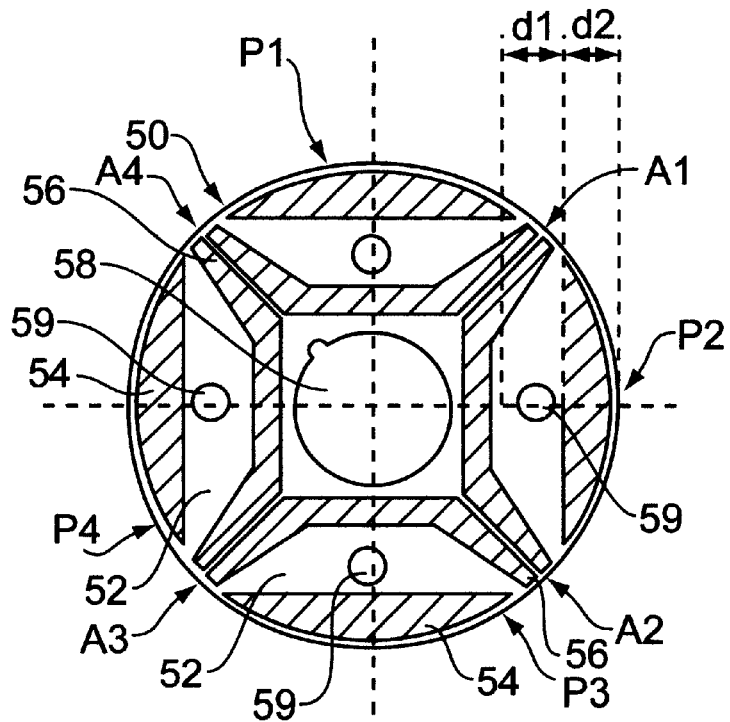
FIG. 4 is a schematic drawing for illustrating a rotor structure of a rushless DC motor according to a second embodiment of the present invention.

FIG. 4 is a schematic drawing for illustrating a rotor structure of a brushless DC motor according to a second embodiment of the present invention, where a rotor 50 includes a rotor core 52 buried by an external permanent magnet 54 and an internal permanent magnet 56 formed in a two-tiered or two-layered structure. Rotor 50 has a plurality of poles P1', P2', P3' and P4', each including an external permanent magnet 54 and an internal permanent magnet 56, and rotor has areas A1', A2', A3', and A4' where each pole of the rotor 50 joins to an adjacent pole of the rotor 50.

The external permanent magnet 54 is formed at a peripheral side thereof with the same circular arc as that of the rotor 50 and the internal permanent magnet 56 of trapezoid shape is protrudingly formed toward a central axle 58 of the rotor 50.

The thickness of the internal permanent magnet 56 measured across both the ends thereof is formed smaller than that of the external magnet permanent 54 measured at an intermediate portion thereof.

Furthermore, the thickness (d2) of the external permanent magnet 54 is the same as or less than the distance (d1) between the external permanent magnet 54 and the internal permanent magnet 56, where the magnets 54 and 56 are made of ferrite or rare earth elements.

In order to prevent the magnets 54 and 56 from being moved outwardly by the centrifugal force of the rotating rotor 50, the magnets 54 and 56 are fastened to a rotor core 52 by the rivet 59 or a plurality of rivets 59, as illustrated in FIG. 4.

Now, an operational effect of the brushless DC motor thus constructed according to the present invention will be described in detail.

The brushless DC motor generates a torque according to a current applied from outside, at which time, a torque constant ($K_T$) is obtained by the following formula 1.

$$K_T = 4N_{ph}\phi_{gm}(\theta)$$   Formula (1)

where, $N_{ph}$ is the number of windings in series and $\theta_{gm}$ is a maximum value of slit flux distribution.

As seen from the formula (1), the torque constant ($K_T$) is a function of rotating the angle and possesses a period according to the driving method.

Accordingly, the total torque for rotating a rotor in a brushless DC motor includes a cogging torque generated by the change of electromagnetic position energy regardless of the torque generated by application of current to the brushless DC motor and a current applied to the brushless DC motor.

At this time, it is possible to reduce vibration and noise generated from the brushless DC motor by increasing the slit but, in this case, when the slit is increased, leakage flux is increased to reduce the effective flux and to thereby decrease the efficiency.

Therefore, in the brushless DC motor according to the first embodiment of the present invention, the rotor core 42 is buried by the external permanent magnet 44 and the internal permanent magnet 46 in two-tier method, thereby improving efficiency of the brushless DC motor and reducing vibration and noise at the same time.

In other words, burial of the external permanent magnet 44 on the surface of the rotor core 42 serves to increase the slit flux density, and, when the flux generated from the rotor core reversely acts upon the flux generated from the external permanent magnet 44, the external permanent magnet 44 is reduced in magnetic force to shorten life, such that in order to prevent the reduction in magnetic force, the external permanent magnet 44 is shortened in length thereof.

Furthermore, when the external permanent magnet 44 is shortened in length thereof, the distance between poles of the rotor 40 is distanced to make the slit flux density uneven, such that, in order to complement the shortcoming, the internal permanent magnet 46 buried in the rotor 40 is extended up to an area where poles of the rotor 40 join.

According to the existence of the rotor core 42 between the external permanent magnet 44 and the internal permanent magnet 46, the flux generated by the stator coil flows along the rotor core 42 to avoid the external and internal permanent magnets 44 and 46 and not to flow in the direction of reduction in magnetic force. Accordingly an optimum field weakening control method can be applied.

According to the existence of the rotor core 42 between the magnets 44 and 46, flux generated by the stator coil flows to generate a reluctance torque. In other words, because magnetic permeability of the magnets 44 and 46 is almost identical to that of vacuum, an area where the magnets 44 and 46 exist can be viewed as slit, such that flux generated by the stator coil flows to the rotor core 42 between the external permanent magnet 44 and the internal permanent magnet 46 to generate a reluctance torque.

At this time, shapes of the external permanent magnet 44 and the internal permanent magnet 46 are optimized to make the reluctance torque occupy 10~30% out of the total torque.

In other words, the flux component at the pole center of the rotor 40 is for generating magnetic torque and the flux component between the poles of the rotor 40 is for generating reluctance torque, such that, when the thickness between ends of the external permanent magnet 44 and internal permanent magnet 46 becomes larger, flux density between the poles of the rotor 40 is also enlarged to thereby enlarge the reluctance torque to increase torque ripple, providing a bad characteristic to noise and vibration sides.

When the thickness at both ends of the external permanent magnet 44 and the internal permanent magnet 46 get smaller, flux density between the poles of the rotor 40 becomes smaller to decrease a motor efficiency.

Accordingly, in order to maximize the motor efficiency and concurrently to reduce the torque ripple, the ratio between the central thickness between the external permanent magnet 44 and the internal permanent magnet 46, and the thickness of the internal permanent magnet 44 should be appropriately adjusted.

Experiment shows that the formation of the thickness across both ends of the external and internal permanent magnets 44 and 46 smaller than the thickness of the intermediate portion thereof maximizes the motor efficiency and reduces the torque ripple.

Furthermore, mechanical strength for supporting the external permanent magnet 44 is increased and concurrently a characteristic of a field weakening control method can be improved by coercive force possessed by the magnets 44 and 46 and by a method where each pole of the rotor 40 is coupled by the rotor core 42 to magnetically saturate the space between the poles of the rotor 40. At this time, because space between the poles of the rotor 40 is magnetically saturated, the torque of the permanent magnets functions instead of the reluctance torque.

In order to prevent the magnets 44 and 46 from being moved outwardly by the centrifugal force generated in proportion to the squared rotating speed of the rotor 40 buried by the magnets 44 and 46, the magnets 44 and 46 are secured to the rotor core 42 by the fastening rivet 49 or by a plurality of rivets 49, as illustrated in FIG. 3.

Meanwhile, the operational effect of the brushless DC motor according to the second embodiment of the present invention is the same as that of the first embodiment of the present invention. The only difference between the two embodiments is that the internal permanent magnet 56 of the second embodiment is of an angled trapezoid shape whereas that of the first embodiment has a round circular shape. The trapezoid shape of the internal permanent magnet 56 is to simplify the manufacturing process.

As apparent from the foregoing, there is an advantage in the brushless DC motor according to the present invention in that the external and internal permanent magnets are buried in a rotor core in a two-tier or two-layer structure to form the poles of the rotor, thereby improving efficiency of the motor and reducing vibration and noise, as well.

What is claimed is:

1. A brushless direct current (DC) motor comprising a rotor, said rotor comprising a rotor core, and further comprising each pole of said rotor comprising a two-layered structure of an external permanent magnet and an internal permanent magnet buried in said rotor core, said external permanent magnet being formed at a peripheral side of said rotor core and having a same arc at an outside surface as that of said rotor.

2. The brushless direct current (DC) motor as claimed in claim 1, further comprised of said internal permanent magnet having mutually different circular arcs at an inside surface and an outside surface of said internal permanent magnet, said internal permanent magnet being protruded toward a central axle of said rotor, and both ends of said internal permanent magnet are extended to an area where said each pole of said rotor joins to an adjacent pole of said rotor.

3. The brushless direct current (DC) motor as claimed in claim 2, further comprised of an inner radius of said internal permanent magnet is given as r1, an outer radius of said internal permanent magnet is given as r2 and an outer radius of said external permanent magnet is defined as r3, and said external permanent magnet and said internal permanent magnet are formed according to a ratio of r2<r3<r1.

4. The brushless direct current (DC) motor as claimed in claim 2, further comprised of a thickness at both ends of said internal permanent magnet being formed smaller than that of an intermediate portion of said internal permanent magnet.

5. The brushless direct current (DC) motor as claimed in claim 2, further comprised of a thickness of said external permanent magnet being formed to be no greater than a distance between said external permanent magnet and said internal permanent magnet.

6. The brushless direct current (DC) motor as claimed 2, further comprised of said external permanent magnet and said internal permanent magnet being comprised of ferrite.

7. The brushless direct current (DC) motor as claimed in claim 2, further comprised of said external permanent magnet and said internal permanent magnet being comprised of rare earth elements.

8. The burshless direct current (DC) motor as claimed in claim 1, further comprised of said internal permanent magnet comprising a trapezoid shape and being formed toward a central axle of said rotor, and both ends of said internal permanent magnet being extended to an area where said each pole of said rotor joins to an adjacent pole of said rotor.

9. The brushless direct current (DC) motor as claimed in claim 8, further comprised of a thickness at both ends of said internal permanent magnet being formed smaller than that of an intermediate portion of said internal permanent magnet.

10. The brushless direct current (DC) motor as claimed in claim 8, further comprised of a thickness of said external permanent magnet being formed to be no greater than a distance between said external permanent magnet and said internal permanent magnet.

11. The brushless direct current (DC) motor as claimed 8, further comprised of said external permanent magnet and said internal permanent magnet being comprised of ferrite.

12. The brushless direct current (DC) motor as claimed in claim 8, further comprised of said external permanent magnet and said internal permanent magnet being comprised of rare earth elements.

13. The brushless direct current (DC) motor as claimed in claim 1, further comprised of a thickness at both ends of said internal permanent magnet being formed smaller than that of an intermediate portion of said internal permanent magnet.

14. The brushless direct current (DC) motor as claimed in claim 1, further comprised of a thickness of said external permanent magnet being formed to be no greater than a distance between said external permanent magnet and said internal permanent magnet.

15. The brushless direct current (DC) motor as claimed in claim 1, further comprised of said external permanent magnet and said internal permanent magnet being comprised of ferrite.

16. The brushless direct current (DC) motor as claimed in claim 1, further comprised of said external permanent magnet and said internal permanent magnet being comprised of rare earth elements.

* * * * *